H. H. TRENOR.
Passenger Register.

No. 95,540.                                   Patented Oct. 5, 1869.

WITNESSES:

INVENTOR:

United States Patent Office.

HENRY H. TRENOR, OF NEW YORK, N. Y.

Letters Patent No. 95,540, dated October 5, 1869.

IMPROVEMENT IN AUTOMATIC PASSENGER-REGISTER.

The Schedule referred to in these Letters Patent and making part of the same.

*To all whom it may concern:*

Be it known that I, HENRY H. TRENOR, of the city of New York, in the county of New York, and State of New York, have invented a new and useful Improvement in Mechanism or Apparatus for Registering Persons or Things, entering any place or vehicle, or passing over such apparatus; and I do hereby declare that the following is a full, clear, and exact description thereof, and of its mode or manner of operation, reference being had to the accompanying drawings, and to the letters of reference marked thereon, and making a part of this specification.

The nature of my invention consists in the construction and arrangement of a peculiar mechanism or apparatus, which can be applied to or connected with any place of entrance, leading either to an edifice, apartment, or bridge, &c., or which can be combined with a vehicle of any kind, and which will register or record the passing of any person or thing, as a vehicle, &c., entering any such building, apartment, bridge, or vehicle, and by which the weight of the person or thing, so passing into such place, is caused to register or record his, her, or its passing.

Figure 1:
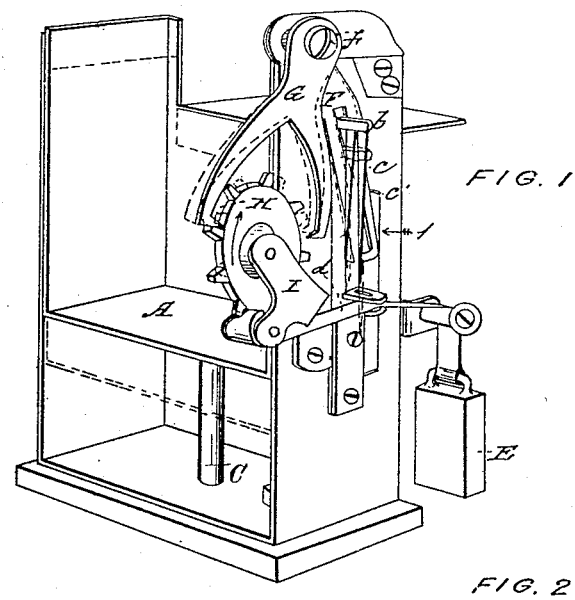
Figure 1 illustrates one method of arranging such mechanism or apparatus, with the device for raising the same.

A yielding step or platform, A, and which may be inserted in or made a part of the floor of any building or entrance-way, or which may be made one of the steps, when the apparatus is connected with a vehicle, is combined with a suitable spring, B, or springs, when more than one is required, in such a manner that when any person or thing passes upon such step or platform, it will yield or sink a little under such weight, but as soon as the pressure is removed therefrom, the spring B will elevate the step or platform to its natural or normal position. Such spring or springs may be attached to a frame-work, within which the step or platform moves, as shown in the drawings, or may be placed directly under such platform, or may be arranged in many different ways, according to the circumstances or location under which the yielding platform is applied to or combined with different structures, it being only necessary that such spring or springs will permit the descent of the platform when pressure is upon it, and will quickly and certainly carry up such platform, as soon as the weight or pressure is removed therefrom.

Fig. 1 shows, by heavy lines, such platform or step in its natural position, or when no pressure is upon it, and also, in red lines, such step in position when pressure has carried it down some little distance.

In practical use and operation, the extent of the downward movement of the step or platform may be regulated, as desired, and generally a descent of a quarter of an inch will be sufficient.

C represents a guide-rod, to steady the movements of the platform A, but any suitable device or arrangement may be used for this purpose.

Connecting with the step or platform A, either by one of its upright sides $a$, as shown in the drawing, or in any suitable manner, is an arm, $b$, which moves vertically up and down with the step or platform A, and which carries one or more piercing-points or rods $c\ c'$, which, as the step is forced down, pass through a strip of paper, muslin, or other suitable material, $d$, supported between slides or leaves $e\ e'$, or in any sufficient manner, and, by such perforation, register or record the passing of the individual or thing passing on or over the platform or step A.

Such strip $d$ is wound upon and carried by a drum, D, and its movement and delivery, so as to prevent its being perforated more than once in any place, controlled by means of a weight, E, or by a drum, upon which it winds, and which is revolved by means of a spring, which latter device is considered most preferable.

Attached to one of the side supports of the yielding step or platform is a slotted arm or plate, F, which has motion on a centre or pivot, $f$, and through the slot, in which passes the piercer-arm $b$, which is connected with the step A. This slotted arm or plate F does not, when in its normal position, stand vertically, but is inclined, as shown in fig. 1, so that as the step and arm $b$ are pressed down, such slotted plate will be moved in the direction of the arrow 1, shown in fig. 1.

Turning on the same pivot $f$, and connected with the slotted plate F, is a forked or anchor-lever, G, having pallets at its ends, which work in and act against the escapement-wheel H, which is fixed to the paper-carrying drum D, such escapement and drum being supported by a bracket or arm, I.

Figure 2:
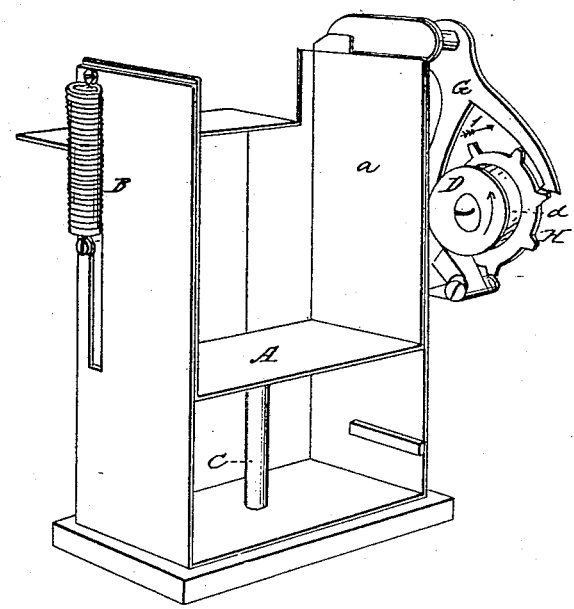
Figure 2 shows the registering or recording-mechanism or apparatus.

Fig. 2 shows the position of the anchor and escapement, when the step or platform A is in its natural position, or when no pressure is upon it.

As soon as pressure bears upon the step A, and the piercer-arm $b$ descends, and the perforating-points $c\ c'$ enter the paper, the slotted plate and anchor are moved in the direction of the arrows 1, and the pallet 2 lifted from the tooth of the escapement, so that as soon as these points are drawn from out the paper, the weight E, or its equivalent, will draw the paper ribbon $d$ a certain distance, equal to the space between any two escapement teeth, and bring the next tooth of the escapement against the pallet, as seen in fig. 2.

Every pressure on the step A thus not only registers the passage of the individual or thing producing the pressure, but also causes a given progression of the paper or other ribbon, so as to receive another perforation in a different place.

The extent of the descent of the step A will, of course, vary according to the weight resting upon it. The piercer-arm $b$ may therefore be fitted with different piercers, so graduated as to lengths that the longer will pierce the paper when the least weight is on the step, and the shortest will only enter the paper when the heaviest weight is on the platform. Each separate piercer may thus represent a given increase of weight, and the register can thus be twofold, showing not only the number of persons or things passing over the platform, or on the step, but, approximately, their different weights.

As will be at once apparent, this mechanism or apparatus can readily be applied, not only to permanent places, as theatres, and edifices of all kinds, bridges, and the like, but can also be attached to public vehicles, and other movable structures.

Its registering-mechanism can also be placed beyond the control or interference of conductors, servants, &c., and the perforated ribbon, when unwound, will correctly indicate the number of passing persons or articles.

What I claim as my invention, and desire to secure by Letters Patent, is—

1. In combination with a step or platform, so constructed as to descend by pressure upon it, and ascend or move back when the pressure is removed, the arrangement of the perforating-points $c\ c'$, one or more, and of the paper or other ribbon, to receive the perforations, when combined and operating substantially as and for the purposes set forth.

2. In combination with a yielding step or platform and perforating-mechanism, as described in the last claim, the arrangement of the inclined slotted plate F, or its equivalent, and the anchor pallets and escapement-wheel, substantially as and for the purposes set forth.

HENRY H. TRENOR.

Witnesses:
FRED. B. SEARS,
S. D. LAW.